United States Patent [19]

Tabori et al.

[11] Patent Number: 4,979,927

[45] Date of Patent: Dec. 25, 1990

[54] ELECTRIC MOTOR COMPRISING LATERAL POSITIONING MEANS

[76] Inventors: Alon Tabori; Abraham Tabori, both of 35a Gibson Street, Haifa, Israel

[21] Appl. No.: 403,092

[22] Filed: Sep. 5, 1989

[30] Foreign Application Priority Data

Aug. 4, 1989 [IL] Israel .................................... 091214

[51] Int. Cl.⁵ .............................................. F16H 7/14
[52] U.S. Cl. ..................................... 474/114; 474/133
[58] Field of Search ....................... 474/101, 109–117, 474/133, 136, 140

[56] References Cited

U.S. PATENT DOCUMENTS

| | | | |
|---|---|---|---|
| 2,640,367 | 6/1953 | Rieser | 474/114 X |
| 3,382,728 | 5/1968 | Takahashi | 474/114 |
| 4,568,318 | 2/1986 | Johnson et al. | 474/114 X |
| 4,631,044 | 12/1986 | Redmon | 474/114 |

*Primary Examiner*—Thuy M. Bui
*Attorney, Agent, or Firm*—Frishauf, Holtz, Goodman & Woodward

[57] ABSTRACT

An electric motor furnished with an end flange for its attachment to the wall of a bracket or the like, includes a belt tensioning contrivance incorporated in the flange. A circular projection the center of which is parallel and eccentrically positioned to the shaft of the motor protrudes out of the end face of the flange and engages with a circular perforation of corresponding size in the bracket wall. The motor shaft extends through the perforation, and a drive pulley is fastened to it. By turning the motor about the axis of the perforation, the shaft and the pulley describe a circular path, whereby the distance between the drive pulley and a stationary driven pulley is changed, permitting ready placing and tensioning of a belt or belts running over the two pulleys.

9 Claims, 3 Drawing Sheets

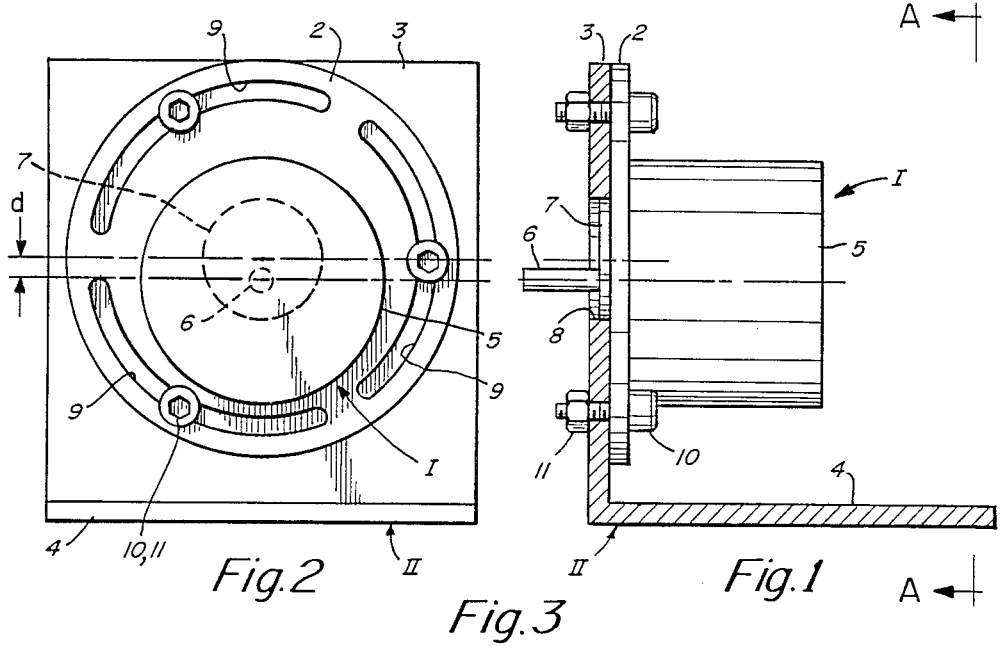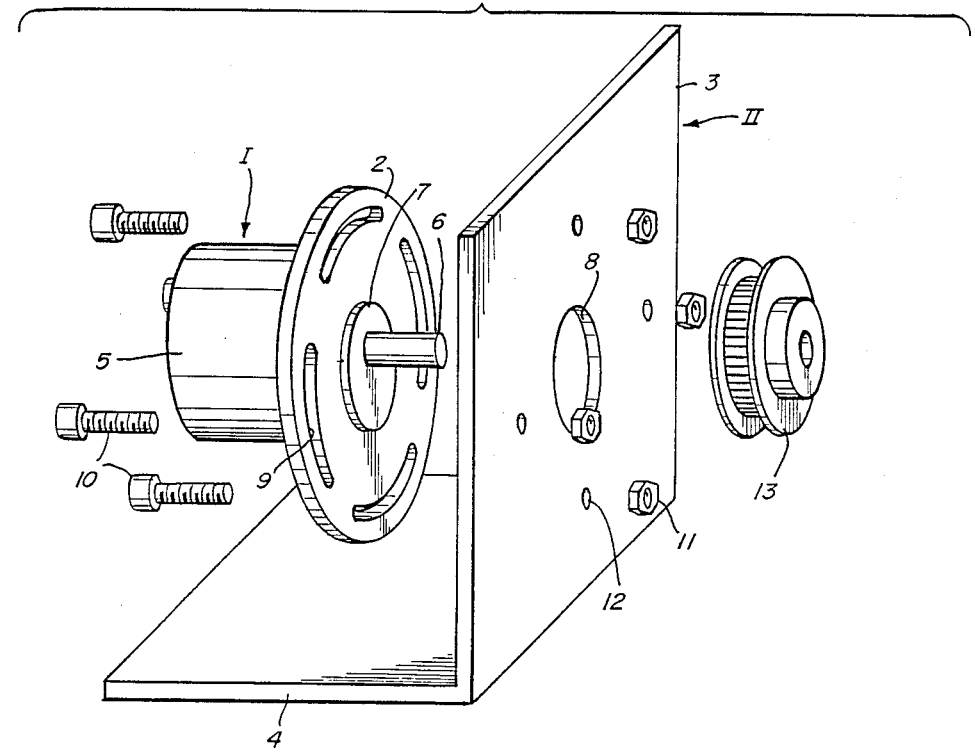

ELECTRIC MOTOR COMPRISING LATERAL POSITIONING MEANS

BACKGROUND OF THE INVENTION

The invention relates to an electric motor and/or generator of the kind provided with a central end flange serving for fastening it to a bracket or a portion of a machine or implement, and to the provision of integral means for its lateral disposal, with the object of placing its shaft in alignment with a gear, of tensioning a belt drive or for other purposes.

Although the invention relates to both electric motors and generators in the same manner, reference in the following will be made to "motors" only, including both kinds of electric machinery, in order to simplify the description and explanation. For the same reason the object of shifting of the motor axis in lateral direction will be referred to only in relation to belt tensioning, although, as mentioned before, there may be other purposes.

Tensioning of a belt drive connecting the motor pulley to a driven pulley is either carried out by means of a tensioning sheave serving to take up the slack, or by moving the electric motor along slotted slide rails. In the case of small motors the entire motor is mounted pivotally, permitting the belt drive to be tensioned by moving the motor about its pivot. In the case of flanged motors the best known solution is by means of a tension sheave, but this has the drawback of consuming additional energy by friction and by bending the belt in outward and inward direction during every passage. Another solution is by sideways shifting of the entire bracket holding the motor which, due to its construction, is rigidly fastened to the bracket.

It is the object of the present invention to dispense with both above kinds of belt tensioning by providing the motor itself with tensioning means permitting a certain range of shifting of the motor shaft in order to tension the belt or to bring a gear wheel on the shaft into proper engagement with a driven gear.

It is another object to provide simple tensioning means which lend themselves to ready adjustment without application of force, whilst maintaining the pulley or gear in its proper alignment with the driven pulley or gear.

And it is still another object to provide these tensioning means at no extra cost for the customer, by their integration in the motor construction during manufacture.

SUMMARY OF THE INVENTION

Position-adjusting means for an electric motor (or generator) of the kind provided with an end flange for its attachment to the wall of a bracket, an implement or a machine, includes an outwardly projecting portion of the flange surface around the motor shaft, this surface terminating in an outer edge defining a circle having a centre spaced-apart from the central axis of the motor and the motor shaft. The wall serving for attachment of the motor by means of the flange is provided with a perforation or a recess of a diameter co-extensive with that of the edge of the projecting surface, permitting attachment of the flange and the motor, whilst the motor shaft protrudes through the wall and the projecting surface engages with the perforation or the recess, thus permitting rotational shifting of the motor, in order to adjust the position of the motor shaft and to tension the belt. Bolting means are provided for rotatable attachment of the motor to the wall.

In a preferred embodiment the flange is attached to the wall by a number of bolts and nuts extending through holes in the wall and through slots in the flange which perforate the flange along a diameter concentric with the centre of the perforation or recess in the wall. As an alternative, the flange may be provided with holes, while the wall is provided with slots parallel to the outer edge of the perforation or recess.

In another embodiment the flange is circular and is not provided with bolt holes, but is pressed onto the wall by means of a ring-shaped collar which, in its turn, is fastened to the wall by a number of bolts and nuts. Rotation of the flange respective to the wall is effected by loosening the nuts and moving the shaft into the necessary position for tensioning the belt or engaging the respective gears.

Instead of by a ring-shaped collar the flange can also be attached to the wall by means of clamps as known to the art, likewise permitting rotation of the motor, whenever required. The projecting surface may be an uninterrupted area in stub-shape or may be in the form of a number of projecting points or small areas, a preferred embodiment being in the form of several screws inserted into the flange in an eccentric circle.

The flange may be integral with the motor casing to be cast and machined in one piece, or it may be in the form of a separate unit to be attached to the motor casing, which may be originally provided with a flange or not.

BRIEF DESCRIPTION OF THE DRAWINGS

FIG. 1 is part section, part side view of an assembly of a flanged motor attached to an angular bracket by means of the belt-tensioning means of the invention, FIG. 2 is a front view of the assembly shown in FIG. 1 along the line A—A, FIG. 3 is an isometric exploded view of the assembly of FIGS. 1 and 2, including a ribbed belt pulley.

DETAILED DESCRIPTION OF THE DRAWINGS

Figure 5:
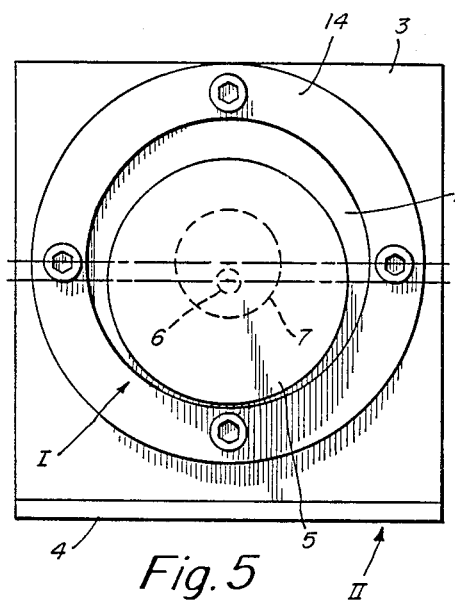
FIG. 5 is a front view of the assembly shown in FIG. 4 along the line B—B.

With reference to FIGS. 1, 2 and 3 of the drawings:- an electric motor (or generator) I is provided with an end flange 2 serving to mount the motor on a wall 3 of an angular bracket II, the bracket being firmly attached to a machine base or the like (not shown) by means of a base plate 4. The motor is shown schematically and includes a motor casing 5 and an output shaft 6 concentric with the casing, while the flange 3 is shown to be eccentrically positioned in respect of the motor axis, the distance between the two centres being denoted by the letter "d". A flat stub 7 Which is concentric with the flange and eccentric in regard to the shaft, projects out of the flange surface and engages with a circular perforation 8 in the wall 3, the motor shaft 6 protruding through the perforation to the other side of the wall 3. The flange 2 is slotted by three to four arcuate slots 9 in concentric alignment with the stub 7, the slots serving for attachment of the flange to the wall 3 by means of bolts 10 and nuts 11 respectively extending through one of the slots 9 and through holes 12 in the wall 3. FIG. 3 also shows a ribbed belt pulley 13 to be mounted on the shaft 6.

For tensioning a belt connecting the pulley 13 with a driven pulley the nuts 11 are slightly loosened permitting the motor and the flange to be rotated, whereby the pulley describes a circular path around the center of the stub, until the correct distance between the two pulleys has been reached. By re-tightening the nuts 11 the motor is now in rigid position on the bracket II, until slackening of the belt requires renewed tensioning.

Figure 4:
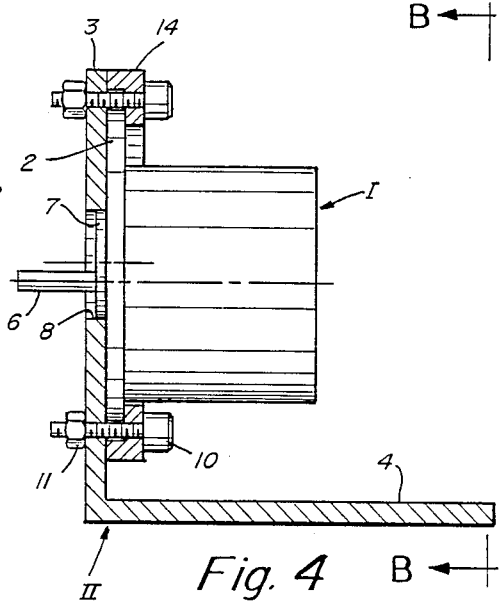
FIG. 4 is part section, part side view of a second embodiment of the motor-bracket assembly, showing a clamping ring as fastening means.
Figure 6:
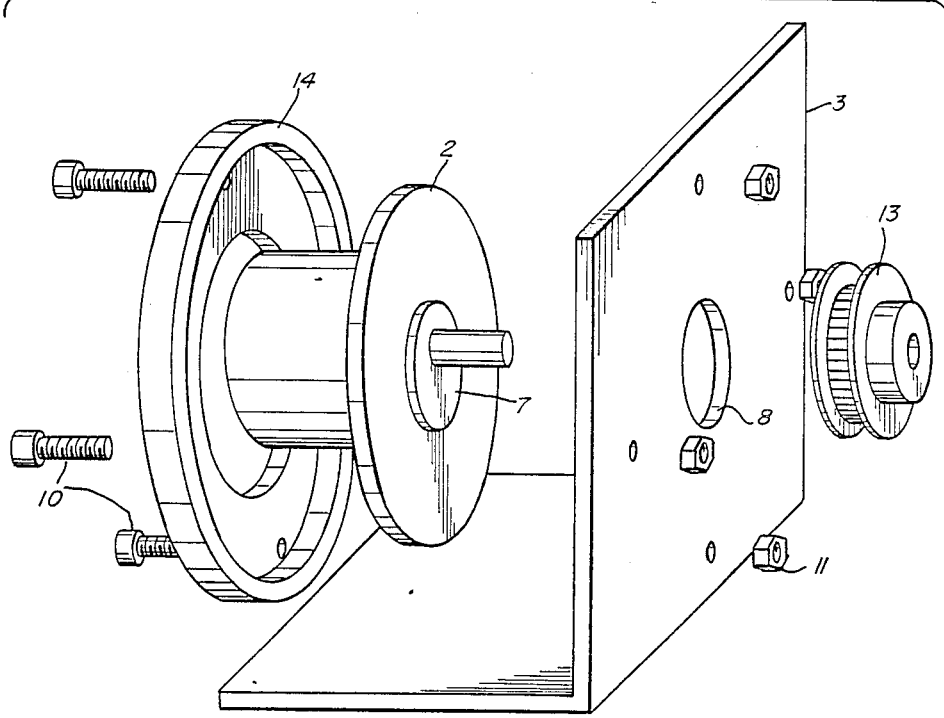
FIG. 6 is an exploded, isometric view of the assembly shown in FIGS. 4 and 5.

The assembly shown in FIGS. 4, 5 and 6 is in most components identical with the assembly shown in FIGS. 1, 2 and 3, except for the fastening means connecting the motor I to the wall 3 of the bracket II. Herein the flange 2 is clamped to the wall 3 by means of an annular collar 14 clamping the flange 2 to the wall 3 by means of bolts and nuts 10 and 11. The flange is of smaller diameter than that illustrated in the aforedescribed embodiment, since it requires no space for the slots 9. It is likewise eccentrically mounted on the motor casing concentrically with the stub 7.

By loosening the nuts 11 the flange is freely rotatable inside the collar 14, and the motor pulley 13 can be brought into the required belt-tensioning position, where after the nuts are tightened again.

Figure 7:
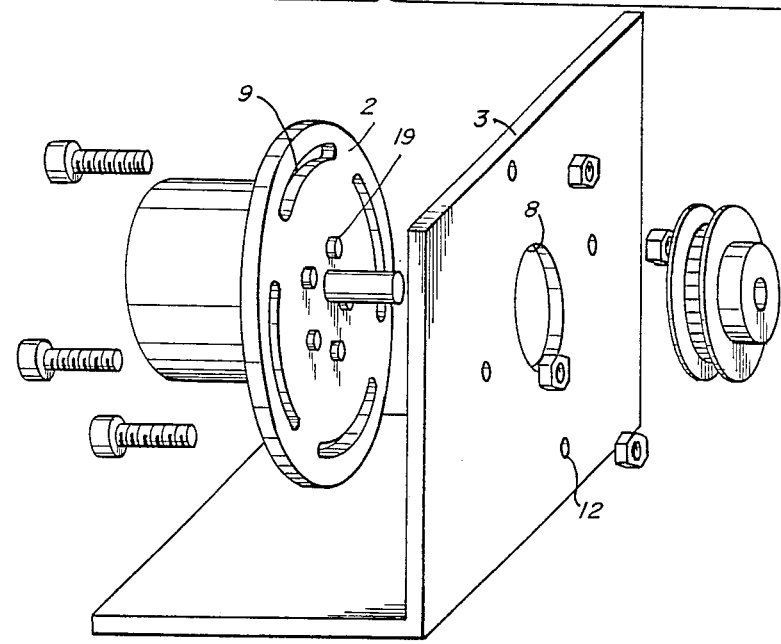
FIG. 7 shows a third embodiment of the assembly including a projecting area in the form of buttons or screw heads.

The assembly illustrated in FIG. 7 differs from the afore described motor-bracket assemblies in the shape of the projecting surface only, wherein the flat stub 7 is replaced by a number of screw heads 19 which project out of the flat surface of the flange 2. The common circumference of the five heads shown in the drawing defines a circle of the size of the circular perforation 8 in the bracket wall 3, thus maintaining the flange in coaxial alignment with the perforation. In this embodiment fastening of the flange and motor to the bracket is by means of bolts and nuts extending through slots 9 in the flange and holes 12 in the bracket wall, identical with the fastening means shown in FIG. 3.

Figure 8:
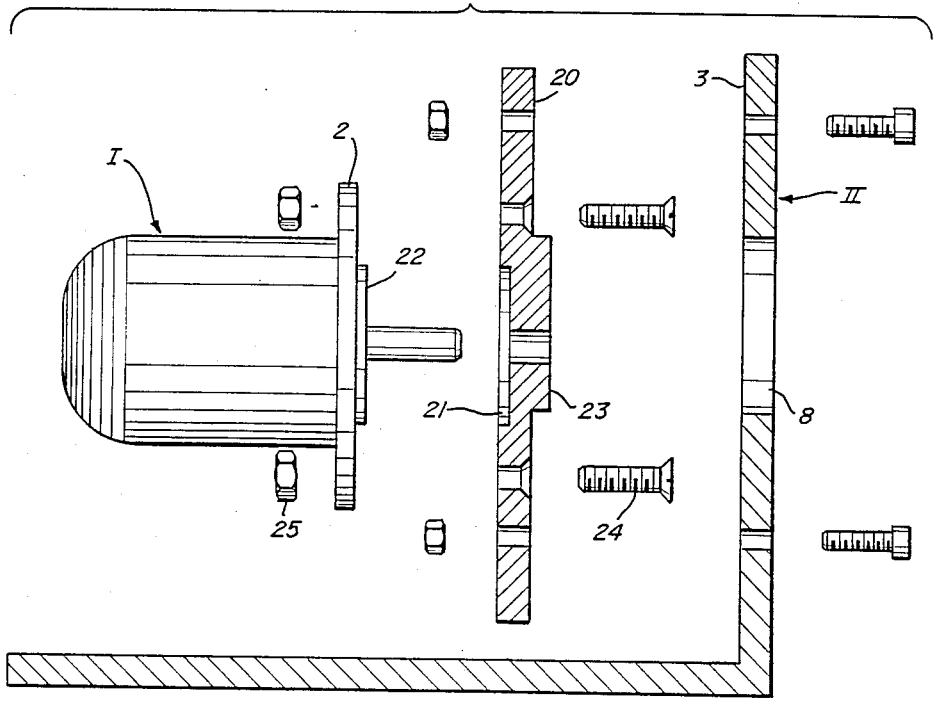
FIG. 8 is an exploded side view of an assembly including a separate, intermediate flange disposed between a bracket and an electric motor.

The assembly illustrated in FIG. 8 comprises a flanged motor I provided with an integral flange 2, a bracket II similar to those shown in the preceding drawings, with the addition of an intermediate flange 20. This flange is circular, is provided with a circular recess 21 on the side facing the motor of a size co-extensive with the stub 22 protruding out of the motor flange 2, and with a projecting stub 23 on the side facing the bracket wall of a diameter cooperating with the perforation 8 in the wall 3. The flange 20 is fastened to the motor flange 2 by bolts and nuts 24 and 25, while it is fastened to the bracket wall by bolts and nuts 10 and 11 as illustrated in the foregoing. The advantage of this embodiment is that a standard motor can be used, whereas in the other embodiments special castings have to be made in respect of the eccentric flange.

It will be understood that eccentric fastening of the motor can be done in more ways than illustrated and described in the foregoing, and that the components may undergo variations and modifications within the scope of the appended claims and the spirit of the invention.

It is, for instead, proposed that the stub 7 be replaced by any other shape as long as it serves to permit the flange and the motor to be rotated about the centre defined by the perforation 8, such as a hexagonal projection. The drawings show that the stub is integral with the flange, but it may be in the form of a disc bolted to the flange in concentric alignment, in case this would reduce production costs.

The cheapest way of producing the perforation 8 is by machining it out of the wall 3, but it may also be in the shape of a perforation of a size permitting the random positioning of the motor shaft, and a circular recess of the size of the stub 7. In contradistinction to the designs shown before there may be an embodiment provided with a circular recess in the flange surface and an annular projection on the inside of the wall engaging with the recess. It can, however be shown that the most practical manners of producing the belt-tensioning arrangement are those illustrated in the accompanying drawings and described in the specification.

We claim:

1. Belt-tensioning means for an electric motor or generator of the kind provided with a shaft having a central axis, an end flange of circular shape concentric with said shaft and an axis of said motor and said flange having an end surface, perpendicular to said motor axis, said flange serving for fastening said motor to a planar surface of a wall which is a part of a bracket, an implement or a machine, said wall being perforated by a circular perforation through which said motor shaft penetrates for the purpose of fastening of a pulley or gear on said shaft on the opposite side of said wall, the belt-tensioning means comprising:
an outwardly projecting portion on said end surface of said flange facing said planar wall surface, said outwardly projecting portion terminating in an outer edge defining a circle of a diameter coextensive with the diameter of said perforation in said wall of said bracket and having a center spaced-apart from said central axis of said shaft, said outwardly projecting portion engaging with said perforation and permitting rotational shifting of said flange and said motor to effect tensioning of said belt by moving said shaft and said pulley or gear; and
attaching means for attaching said flange and said motor to said wall so as to permit said rotational shifting while said attaching means is loosened and to firmly hold said flange and said motor in a belt-tensioning position, while said attaching means are firmly fastened.

2. The belt-tensioning means as defined in claim 1, wherein:
said motor or generator includes a casing; and
said end flange is integral with said casing of said motor or generator.

3. The belt-tensioning means as defined in claim 1, wherein said end flange is a separate unit attached to said motor by fastening means.

4. The belt-tensioning means of claim 3, wherein said fastening means comprises screws.

5. The belt-tensioning means of claim 3, wherein:
said flange has arcuate slots therein which are concentric with said circular outer edge of said projecting portion; and said attaching means for attaching said flange to said wall comprises bolt and nuts which extend through bores in said wall and through arcuate slots in said flange.

6. The belt-tensioning means of claim 1, wherein:
said wall has arcuate slots therein, said arcuate slots being concentric with said circular perforation in said wall; and
said attaching means for attaching said flange to said wall comprises bolts and nuts which extend through bores in said flange and through arcuate slots in said wall.

7. The belt-tensioning means of claim 1, further comprising an annular collar having an outer diameter larger than that of said flange, said annular collar engaging said flange and urging it onto said wall by means of bolts and nuts.

8. The belt-tensioning means of claim 1, wherein said projecting portion on said end surface of said flange is in the form of a solid stub.

9. The belt-tensioning means of claim 1, wherein said projecting portion on said end surface of said flange comprises a plurality of projecting surfaces having an outer common edge forming a circle eccentric to the center of said shaft.

* * * * *

UNITED STATES PATENT AND TRADEMARK OFFICE
CERTIFICATE OF CORRECTION

PATENT NO. : 4,979,927

DATED : December 25, 1990

INVENTOR(S) : TABORI et al

It is certified that error appears in the above-identified patent and that said Letters Patent is hereby corrected as shown below:

Title page, Section [76]:

Change the address of both the inventors to:

35a Gilboa Street
Haifa, Israel

Signed and Sealed this

Twenty-eighth Day of July, 1992

Attest:

DOUGLAS B. COMER

*Attesting Officer*    *Acting Commissioner of Patents and Trademarks*